United States Patent [19]

Bolusset et al.

[11] Patent Number: 5,516,121
[45] Date of Patent: May 14, 1996

[54] DRY SLIP RING SEAL HAVING INDEPENDENT COOLING LOOPS

[75] Inventors: Daniel Bolusset; André Charbonnier, both of Le Creusot, France

[73] Assignee: Framatome, Courbevoie, France

[21] Appl. No.: 188,129

[22] Filed: Jan. 28, 1994

Related U.S. Application Data

[63] Continuation-in-part of Ser. No. 643,114, Jan. 18, 1991, abandoned.

[30] Foreign Application Priority Data

Jan. 18, 1990 [FR] France ................... 90 00562

[51] Int. Cl.⁶ ........................................ F16J 15/34
[52] U.S. Cl. ..................... 277/16; 277/22; 277/71; 277/65
[58] Field of Search ............... 277/15, 22, 70, 277/71, 72 R, 74, 81 R, 16, 65, 85, 167.3, 82, 26, 28

[56] References Cited

U.S. PATENT DOCUMENTS

| | | | |
|---|---|---|---|
| 730,925 | 6/1903 | Klein | 277/16 |
| 781,266 | 1/1905 | Bryan et al. | 277/16 |
| 870,152 | 11/1907 | Alberger | 277/16 |
| 941,394 | 11/1909 | West | 277/16 |
| 1,795,311 | 3/1931 | Meyer | 277/15 |
| 2,536,565 | 1/1951 | Ostergren | 277/16 |
| 2,554,234 | 5/1951 | Baudry et al. | 277/16 X |
| 2,921,805 | 1/1960 | Shevchenko | 277/74 |
| 3,147,982 | 9/1964 | Klein | 277/16 |
| 3,542,374 | 11/1970 | Neilson et al. | 277/16 |
| 3,600,101 | 8/1971 | Oglesby | 277/16 X |
| 3,746,350 | 7/1973 | Mayer et al. | 277/15 X |
| 3,874,676 | 4/1975 | Taylor et al. | 277/22 |
| 3,951,417 | 4/1976 | Chernykh | 277/70 X |
| 4,082,297 | 4/1978 | Adams | 277/15 |
| 4,381,867 | 5/1983 | Ohgoshi | 277/82 X |
| 4,410,188 | 10/1983 | Copes | 277/65 |
| 4,498,681 | 2/1985 | Heinz | 277/70 X |
| 4,691,276 | 9/1987 | Miller et al. | 277/28 X |
| 4,872,689 | 10/1989 | Drumm | 277/81 R X |

FOREIGN PATENT DOCUMENTS

| | | | |
|---|---|---|---|
| 1142283 | 9/1957 | France . | |
| 1346832 | 11/1963 | France . | |
| 2308032 | 11/1976 | France | 277/26 |
| 0196862 | 10/1906 | Germany | 277/58 |
| 0468847 | 11/1928 | Germany | 277/22 |
| 947349 | 8/1956 | Germany . | |
| 2125529 | 12/1971 | Germany | 277/22 |
| 0184362 | 10/1983 | Japan | 277/70 |
| 0270579 | 7/1964 | Netherlands | 277/74 |
| 0626295 | 9/1978 | U.S.S.R. | 277/22 |
| 1010367 | 4/1983 | U.S.S.R. | 277/26 |
| 0194350 | 3/1923 | United Kingdom | 277/16 |
| 0857943 | 1/1961 | United Kingdom | 277/59 |

OTHER PUBLICATIONS

"Cooling Device of Built-up Type Packing Case"—vol. 8 #26—Feb. Mar./1984.

*Primary Examiner*—Scott W. Cummings
*Attorney, Agent, or Firm*—Pollock, Vande Sande & Priddy

[57] ABSTRACT

A dry slip ring seal for incorporation in apparatus comprising a fixed element, such as a casing, and a revolving element, such as a shaft. At least one of these elements incorporates an internal conditioning circuit enabling the circulation of conditioning fluid which conditions one of a plurality of ring seals, as well as, at least partially, the other of the two elements.

5 Claims, 2 Drawing Sheets

DRY SLIP RING SEAL HAVING INDEPENDENT COOLING LOOPS

This application is a continuation-in-part of application Ser. No. 07/643,114 filed Jan. 18, 1991 now abandoned.

FIELD OF THE INVENTION

This invention concerns in particular a slip ring seal for a revolving part, and more specifically a slip ring seal of the so-called dry seal type.

BACKGROUND OF THE INVENTION

Effective conditioning of this type of seal is essential for safe functioning of many revolving machines, particularly in maintaining a seal required to avoid deformations or damage which might be caused by excessive heating or cooling of the seal.

There are various known solutions for realizing a dry slip ring seal where a revolving shaft passes through a chamber. A labyrinth with reduced gap can be used to confine a non-dangerous gas. Seals with a film of oil or mechanical seals can be used in the case of dangerous gases. The oil circulating on the fixed and mobile ring seals then ensures conditioning either by evacuating the calories produced by its shearing or by adding the calories necessary to maintain a temperature compatible with good functioning.

Such a method of conditioning is not possible in the case of a dry ring seal, which has no such oil circulation.

In heavy duty conditions, as is the case for example for dry ring seals at high speed, high pressure, and/or where a considerable surface area of the revolving parts is in contact with a hot gas, heat generation becomes important and the temperature inside the seal reaches such a value that it can cause destruction of the parts, thus leading to serious failure of a turbo machine.

This risk is particularly sensitive in processes which, for safety reasons, require the mandatory presence of three seal interfaces. The seal comprises three successive internal chambers, from inside the enclosure containing the gas to be confined, out to atmosphere.

The separations between the inside of the enclosure and the first chamber, between two successive chambers, and between the last chamber and atmosphere, are each achieved with the help of a slip ring seal working in conjunction with a fixed ring seal, often referred to as "fixed insert". An auxiliary gas is injected into the intermediate chamber. This auxiliary gas passes by leakage into the first and third chamber, from each of which it is extracted. Heat is evacuated partly by the leakages of gas into the seal interfaces.

It should however be noted that the gas extracted from the first chamber is polluted by the gas to be confined and must in some cases be treated. A known solution for evacuating calories from such a seal consists of increasing the amount of gas leaking through this seal.

But this may prove dangerous, for the following reasons:

leakage of the confined gas to enable evacuation of the heat may lead to operating safety problems, too great an axial gap between the fixed and the slip ring seals reduces the axial resistance of the gas film circulating radially within this space. Under the effect of various mechanical and aerodynamic stresses, spurious contacts may occur as a result between a fixed ring and a slip ring. Such contacts risk leading to an ultimate loss of impermeability. The frequently encountered problem of cooling, although important, is not the only problem that needs to be taken into account. Indeed, in some installations, a dry slip ring seal is placed in a very cold ambiance, and a hot gas is injected into the seal interface. In this case, if heat generation is insufficient, there results a cooling of the gas which may cause a liquid (condensation . . . ) to form, thereby destroying the seal. To avoid the gas cooling, one solution would be to increase the flow, but in this case would lead to the disadvantages mentioned earlier.

SUMMARY OF THE INVENTION

It is an object of the invention to find a simple way to achieve a dry slip ring seal for a revolving part enabling safer functioning of a revolving machine without creating or increasing fluid leakage through the seal and without risk of the confined fluid polluting an auxiliary fluid.

To these ends, the purpose of the invention is a dry slip ring seal for a revolving part, comprising an intermediate chamber, and in which one of the fixed and revolving bodies constituting the seal has an internal conditioning circuit.

BRIEF DESCRIPTION OF THE DRAWINGS

With the help of the attached drawings, several embodiments of the invention will now be described by way of example.

DESCRIPTION OF THE PREFERRED EMBODIMENT

Figure 1:
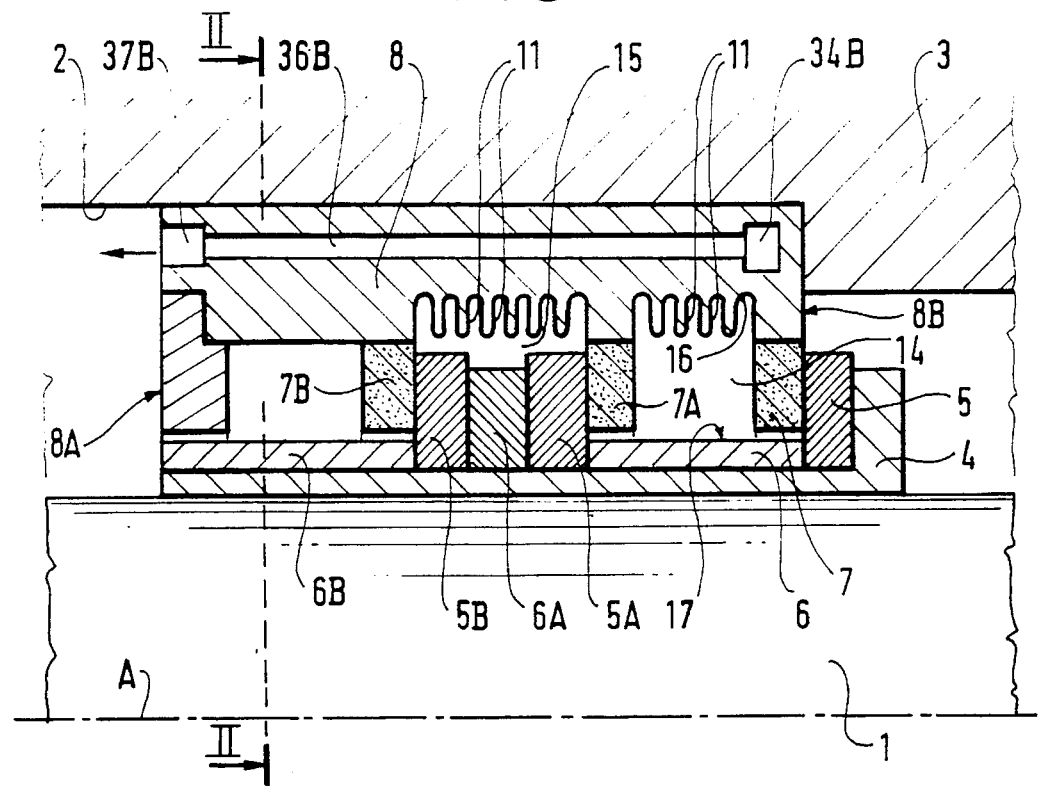
FIG. 1 shows a seal according to the invention in cross-section on an axial plane.
Figure 2:
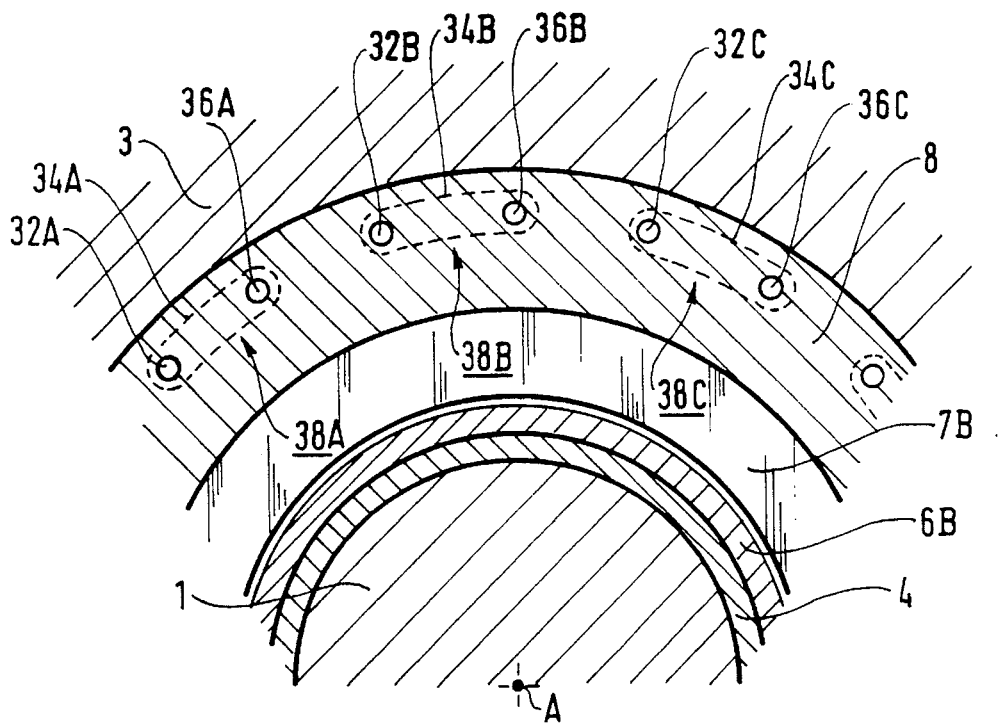
FIG. 2 shows the same seal in cross-section along line II—II of FIG. 1.
Figure 3:
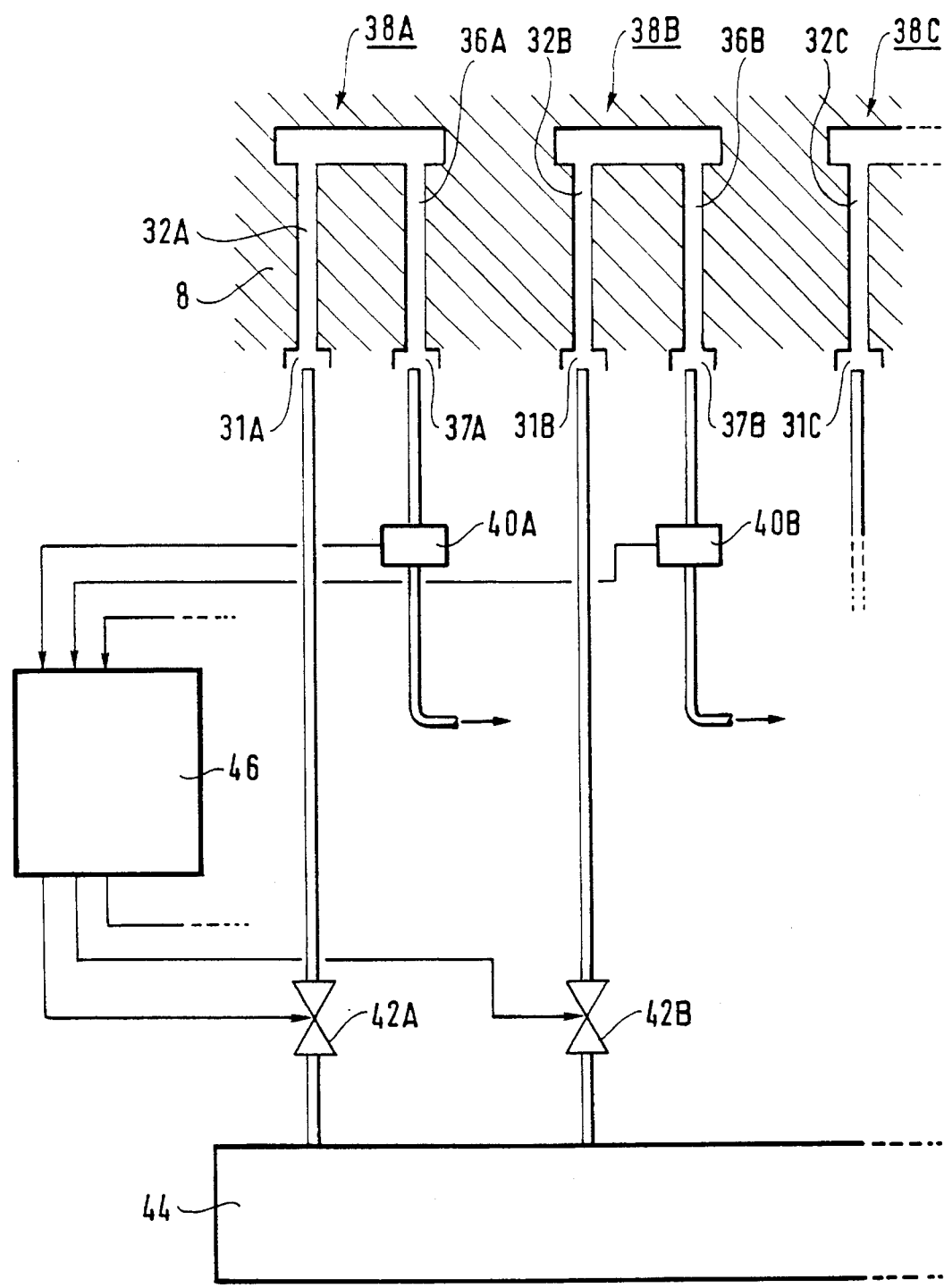
FIG. 3 schematically shows the thermal conditioning circuit of the present invention.

As shown in FIG. 1, a seal according to this invention generally comprises:

a fixed sub-assembly 8, 7 carried by a fixed part 3 in relation to which a revolving part 1 revolves around an axis A, and a revolving sub-assembly 4, 5 carried by the revolving part and working in conjunction with the fixed assembly to stop a fluid intended to be confined from entering between these fixed and revolving parts.

Each of the said fixed or revolving sub-assemblies itself comprises, respectively:

one fixed body 8 or revolving body 4 carried by the fixed part 3 or revolving part 1 opposite the revolving or fixed part of the other sub-assembly, and at least a first and a second ring seal 7 and 7A or revolving ring seal 5 and 5A carried coaxially around an axis A by the said fixed or revolving body. The fixed sub-assembly of the seal given as an example comprises first, second and third fixed rings 7, 7A and 7B. Each of these works in conjunction with an associated slip ring of the same rank, such that 5, 5A and 5B belong to the other said sub-assembly.

Generally speaking, such rings are located so as to at least limit the flow of the fluid to be confined while forming at least one intermediate chamber 14 comprising two main walls 16, 17 respectively formed by the two said fixed and revolving bodies, and two end walls 7 and 7a respectively formed by at least one of the said first fixed and slip rings, and by at least one of the said second fixed and slip rings.

More specifically, in the case of the seal given as an example, the revolving part is the shaft 1 of a revolving machine. It extends along the longitudinal axis of rotation A. The fixed part is a casing 3, which forms part of an enclosure of this machine and which forms a housing 2 to receive the dry slip seal ring.

The revolving body is composed of a ring 4 with a projection at one of its ends. Its axial bore is traversed by shaft 1 which ensures perfect alignment of the whole.

The external surface of this ring receives the three slip ring seals 5, 5A, 5B which are rotated, e.g., by means of a pin, and kept apart from one another by means of spacing shims 6, 6A and 6B. Each slip ring works in conjunction with the fixed ring seal of same rank 7, 7A or 7B to constitute a seal barrier for the gas to be confined. A first, a second and a third barrier are thus formed by rings 7 and 5, 7A and 5A and 7B and 5B. These delimit two said intermediate chambers 14 and 15. The fixed subassembly comprises, in addition to the fixed rings 7, 7A and 7B, the fixed body 8 which constitutes the exterior envelope of the seal.

Generally speaking, and in conformity with this invention, at least one of the fixed and revolving bodies comprises a conditioning circuit 36B, 34B which is internal to this body and which enables the flow of a conditioning fluid. Body 8 is conditioned in this way. It, in turn, conditions at least one of the ring seals 7, 7A, 7B.

According to an advantageous embodiment, the conditioned fixed body 8 comprises conditioning wings 11 protruding into the intermediate chambers 14 and 15 from the main wall 16 formed by this body, in order to condition an internal fluid contained in these chambers so that this fluid in turn conditions at least one of the ring seals 5A, 5B and/or the other said fixed or revolving body.

The thermal conditioning circuit comprises an angular succession of mutually independent conditioning loops 38A, 38B . . ., each of which comprises one inlet 31A and one outlet 37A in the same connection face, which is an end face of the fixed body. A go conditioning channel 32A extends longitudinally along a major portion of the length of the sealing assembly from the inlet of the loop to a connecting conditioning channel 34A of the loop, which extends in a plane perpendicular to axis A. A return conditioning channel 36A extends longitudinally from the connecting conditioning channel 34A to outlet 37A of the loop.

Each conditioning loop 38A further comprises a temperature sensor 40A for sensing the temperature of the conditioning fluid flowing out from the outlet 37A of each loop, and a flow rate control element 42A for controlling the flow rate of the conditioning fluid in each loop according to the temperature sensed by the temperature sensor.

A control circuit 46 may be provided for receiving all of the temperatures sensed by the temperature sensors 40A, 40B . . . of all of the loops and for responsively controlling all the flow rate control elements of all the loops so as to at least limit temperature gradients and temperature changes in the fixed body.

What is claimed is:

1. A sealing assembly comprising:
   a fixed sub-assembly (7, 8) borne by a fixed part (3) in relation to which a revolving part (1) revolves about a longitudinal axis (A), and a revolving sub-assembly (4, 5) borne by said revolving part and cooperating with said fixed sub-assembly to stop a fluid to be confined from passing between said fixed and revolving parts;
   said fixed sub-assembly comprising a body (8) borne by said fixed part (3) opposite said revolving part, said body being a fixed body;
   said fixed sub-assembly further comprising at least first and second fixed ring seals (7, 7A, 7B) borne coaxially about said axis (A) by said fixed body;
   said revolving sub-assembly further comprising at least first and second revolving ring seals (5, 5A, 5B) borne coaxially about said axis (A) by said revolving body for cooperating with said at least first and second fixed ring seal, respectively in such manner as to restrict passage of said fluid to be confined while forming at least one internal chamber (14, 15) which is internal to said sealing assembly and which comprises two main walls (16, 17) respectively formed by said fixed and revolving bodies, a first end wall formed by at least one of said first fixed and revolving ring seals, and a second end wall formed by at least one of said second fixed and revolving ring seals;
   said sealing assembly further comprising a thermal conditioning circuit internal to said fixed body and enabling circulation of a conditioning fluid therein for thermally conditioning said first and second fixed and revolving ring seals;
   said thermal conditioning circuit comprising an angular succession of mutually independent conditioning loops (38A, 38B . . . ) each of which (38A) comprises:
   one inlet (31A) and one outlet (37A) of said loop in a same connection face which is an end face of said fixed body;
   a go conditioning channel (32A) extending longitudinally along a major portion of a length of said sealing assembly from said inlet of said loop to a connecting conditioning channel (34A) of said loop;
   said connecting conditioning channel (34A) extending in a plane perpendicular to said axis: and,
   a return conditioning channel (36A) extending longitudinally from said connecting conditioning channel to said outlet (37A) of said loop.

2. A sealing assembly according to claim 1, wherein said fixed body (8) comprises conditioning wings (11) protruding into said at least one internal chamber (14) from said main wall (16) formed by said fixed body, in order to thermally condition a fluid contained in said at least one internal chamber.

3. A sealing system comprising:
   a sealing assembly according to claim 1, each conditioning loop (38A) further comprising:
   a temperature sensor (40A) for sensing the temperature of said conditioning fluid flowing out from said outlet (37A) of said each loop; and
   a flow rate control element (42A) for controlling a flow rate of said conditioning fluid in said each loop according to said temperature sensed by said temperature sensor.

4. A sealing system according to claim 3, said sealing system further comprising a control circuit (46) for receiving all of said temperatures sensed by said temperature sensors (40A, 40B . . . ) of all said loops and for responsively controlling all of said flow rate control elements of all of said loops so as to at least limit temperature gradients and temperature changes in said fixed body.

5. A sealing system according to claim 4, said sealing system further comprising a conditioning fluid source (44) for supplying said conditioning fluid to all of said inlets (31A, 31B . . . ) of all of said loops (38A, 38B . . . ).

* * * * *